The present invention relates generally to digital computers and more particularly to decimal computers employing counter-comparison circuits for controlling the operation and the resultant answer of the computed function.

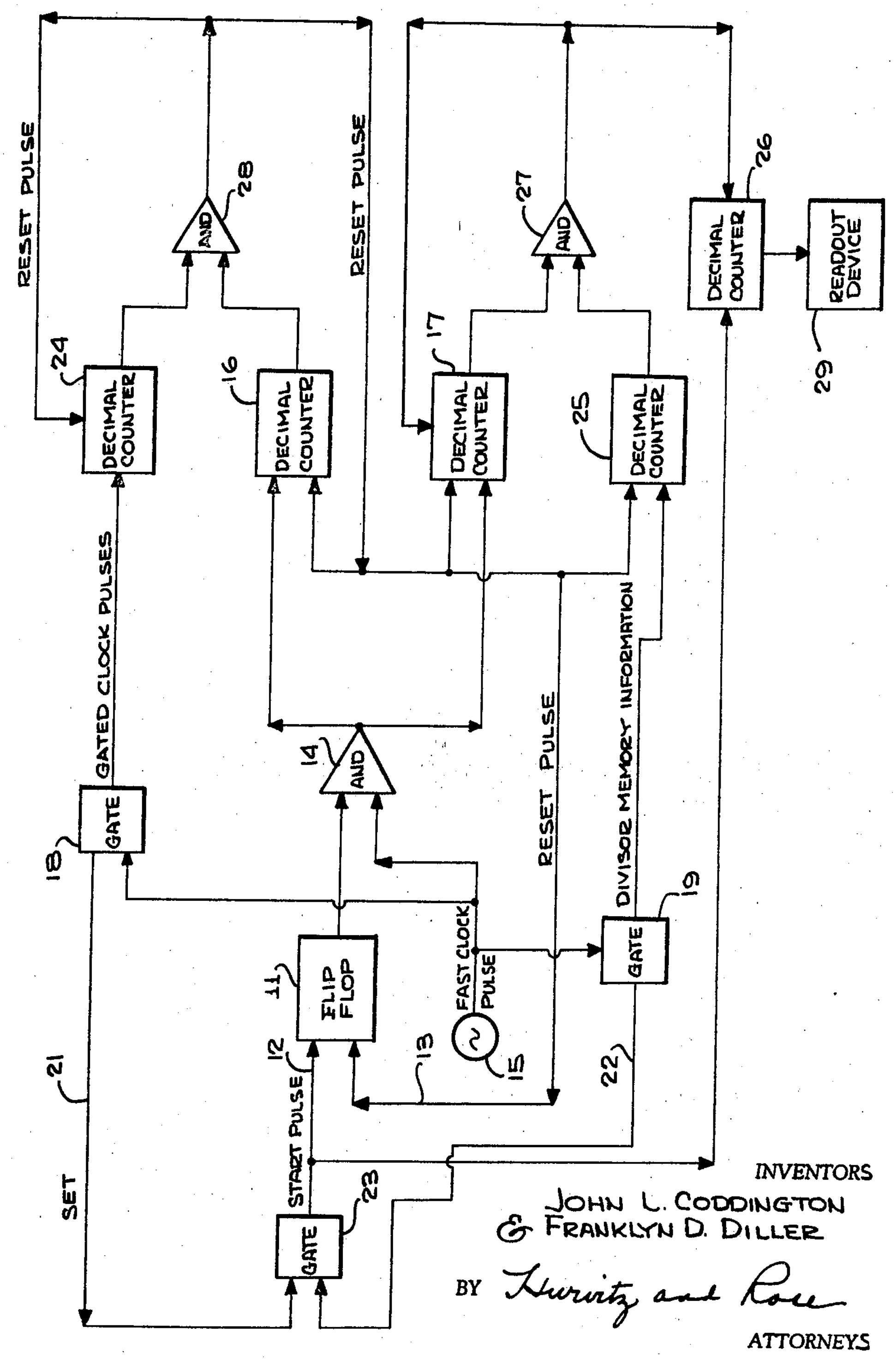
INVENTORS
JOHN L. CODDINGTON
& FRANKLYN D. DILLER
BY Hurwitz and Rose
ATTORNEYS 3,126,475
DECIMAL COMPUTER EMPLOYING COINCIDENT GATE RESPONSIVE TO A PAIR OF COUNTERS John L. Coddington, Cincinnati, and Franklyn D. Diller, Loveland, Ohio, assignors to Avco Corporation, Cincinnati, Ohio, a corporation of Delaware Filed Feb. 1, 1962, Ser. No. 170,604
4 Claims. (Cl. 235—160)

Most modern computers operate in a binary notation sytem or a binary coded decimal notation system. This requires a conversion of the decimal information applied to the machine to the number system employed by the system. Such conversion in both read-in and read-out apparatus requires a considerable amount of apparatus which is extremely costly and often operated at a low frequency. The conversion apparatus employed is generally quite complex and expensive in both development and hardware. To represent numbers of large amplitude, a binary computer must have an extremely large number of operating orders.

The present invention obviates the difficulties encountered with binary machines by employing a machine operating in a decimal number system. With the machine operating in such a number system, the necessity for input and output conversion systems is completely obviated, thus materially reducing the cost and complexity of the system.

In the present system, a number of pulses commensurate with a particular value to be computed is applied to a counter. The counter is set to a decimal number by these pulses and stores the number for utilization in controlling further apparatus of the machine. A second counter is applied with a second number of pulses, commensurate with the other number to be handled by the computing system. The second counter stores a signal commensurate with the decimal number of pulses applied thereto for control of the output apparatus of the computer.

After each of the first and second counters are preset with decimal numbers indicative of the variables applied thereto, a clock pulse generator is applied to a circuit for comparing the number of clock pulses with the decimal number stored in at least one of the counters. A control pulse is generated by the comparison circuit when the number of clock pulses equals the number stored in the counter. The control pulse causes pulses from the second counter to be applied to an output decimal counter.

The clock pulses are also applied to a second comparison circuit for the second counter. When the second comparison circuit count equals the count stored in the second counter, a second control pulse is generated to terminate application of the clock pulses to the first and second comparison circuit and thereby prevent further application of pulses to the output counter. The counter comparison techniques employed for controlling the pulses to be applied to the output counter may be employed in any of the well-known arithmetic operations of addition, subtraction, multiplication or division.

Each of the counters of the present invention is preferably of the decade switching tube type. By utilizing this type decimal counter, for each tens order of the machine capacity, great speed with little complexity in the apparatus is obtained since the need for complex conversion systems is obviated.

It is an object of the present invention to provide a new and improved decimal digital computer employing decimal counters comparison circuits for controlling the number of pulses applied to an output register of decimal form.

It is another object of the present invention to provide a new and improved digital computer that operates at high speed but which is relatively inexpensive since it requires no complex conversion apparatus.

It is another object of the present invention to provide a decimal, digital computer employing a counter-comparison circuit; which computer is susceptible to economy in both cost and space, is highly reliable and has great life expectancy with little maintenance of components required.

It is a further object of the present invention to provide a decimal, digital computer employing a plurality of decimal counter-comparison circuits wherein control pulses are derived from one of the counter-comparison circuits when a stored decimal number indicative of a first variable equals the number of pulses generated by a clock source and the control pulses determine the number of pulses supplied from a second counter-comparison circuit to an output, decimal counter.

The above and still further objects, features and advantages of the present invention will become apparent upon consideration of the following detailed description of one specific embodiment thereof, especially when taken in conjunction with the accompanying drawings, wherein:

The figure is a block diagram of one embodiment of the present invention.

Reference is now made to the single figure of the drawings which discloses the principles of the present invention as employed in a divisor circuit. The divisor circuit includes a flip-flop 11 which generates control pulses in response to a start pulse applied thereto on lead 12 and in response to reset pulses applied thereto on lead 13. The manner in which the reset pulses on lead 13 are derived is explained infra. The output of flip-flop 11 is coupled to AND gate 14 and enables AND gate 14 during the period between generation of a start pulse on lead 12 and a reset pulse on lead 13. A high frequency clock pulse source 15, preferably having a frequency of five megacycles, is coupled as the other input to AND gate 14. The pulses from clock source or pulse generator 15 are coupled through AND gate 14 only when the AND gate is enabled in response to the output of flip-flop 11. The output pulses of AND gate 14 are coupled in parallel to decimal counting circuits 16 and 17.

The output pulses of clock source 15 are also coupled in parallel to gates 18 and 19. Gates 18 and 19 are open for a period of time indicative of the signal applied thereto. The signals applied to gates 18 and 19 are respectively commensurate with the dividend and divisor of the numbers which are to be divided by the computer of FIGURE 1. Since gates 18 and 19 remain open for a time commensurate with the dividend input, N1, and the divisor input, N2, the number of pulses applied through the gates from source 15 is equal to N1 and N2, respectively.

When gates 18 and 19 are closed control pulses are generated on leads 21 and 22, respectively. These pulses are applied to gate 23 which generates the start pulse on lead 12 when both gates 18 and 19 have been closed. This is accomplished in a conventional manner by gate 23 which is enabled by the first pulse it receives on either lead 21 or 22 and passes the second pulse it receives on the opposite one of the leads 21 or 22.

While gates 18 and 19 are open, clock pulses from source 15 are supplied therethrough to decimal counters or registers 24 and 25. When gates 18 and 19 are closed, counters 24 and 25 store decimal numbers commensurate with the variables N1 and N2, respectively.

After gates 18 and 19 are closed, AND gate 14 is enabled and pulses from clock pulse generator 15 are applied to counters 16 and 17, which initially are set to zero. Counter 26, also initially set to zero, is enabled by the start pulse output of gate 23 to be responsive to pulses applied derived from AND gate 27. When the count achieved by counter 17 in response to pulses applied thereto from clock pulse source 15 via AND gate 14, coincides with the count stored in counter 25, an output pulse is generated by AND gate 27. This output pulse is applied as a reset pulse to counter 17 and as a count input pulse to counter 26. Counter 17 is reset to zero in response to the pulse generated by AND gate 27 and starts to count again in response to pulses from source 15. A further output is derived from AND gate 27 when the count stored by counters 17 and 25 coincide. Thus, an output pulse is generated by AND gate 27 each time the number of pulses generated by source 15 is in integral multiple of the count stored in counter 25.

AND gate 27 generates output pulses and supplies them to output storage counter 26 until the number of pulses generated by clock 15, as stored in counter 16, equals the count stored in counter 24. When this occurs, an output pulse is derived from AND gate 28 for resetting counters 16, 17, 24 and 25 to zero and for resetting flip-flop 11 to its state which disables AND gate 14. No further pulses are applied through flip flop 11 to the computing network from clock pulse source 15 when an output pulse is derived from gate 28 to reset the flip flop.

As the pulses are applied to counter 26 a simultaneous read-out is obtained in conventional read-out mechanism 29. It is to be noted that decimal counter 26 and read-out device 29 are not reset upon the generation of an output pulse by AND gate 28. Thus, the value of computed quotient is stored in counter 26 and read-out device 29 until a new problem is inserted into the system. At such time a reest pulse is applied to counter 26 and read-out 29 by gate 23.

The present system may be modified to accomplish the operation of addition, subtraction or multiplication in a relatively simple manner. For addition, it is merely necessary to gate clock pulse source 15 sequentially to decimal counter 26 until gates 27 and 28 derive output pulses. In such a system, the clock pulses from source 15 are not gated to counter 16 until a first output pulse is derived from gate 27. To accomplish subtraction, counter 26 is directly responsive to the output pulses of clock 15. If it is assumed that information indicative of the subtrahend is stored in the counter 25, clock pulses are not applied to counter 26 until an output pulse is derived from AND gate 27. The clock pulses are applied to counter 26 until a further output is derived from AND gate 28, assuming that a count indicative of the minuend was initially stored in counter 24.

To accomplish multiplication by the technique of the present invention, the clock pulse source is directly coupled to decimal counter 26. The multiplier is stored in counter 24 and the multiplicand is stored in counter 25. The output of gate 28 is coupled as the sole input to counter 17 and is not employed as a reset input to counter 24. The output of AND gate 27 is then employed for terminating application of pulses from clock 15 to counter 26 and for resetting each of the counters 24, 16, 17 and 25 to their initial state.

It is to be understood that it is not essential that the start pulses applied to counter 26 and flip-flop 11 be automatically generated in response to the output on lead 21 and 22 of gates 18 and 19, respectively. If desired, the start pulse may be manually generated when a machine operator is aware that counters 24 and 25 have stored therein numbers indicative of N1 and N2. Also gates 18 and 19 may take the form of predetermined counters which generate output pulses until the counts stored therein indicative of N1 and N2, respectively, are generated. If gates 18 and 19 take this form, a pulse forming circuit may be connected to the 0 order output thereof to generate the pulses applied to gate 23.

It is preferred that the counters employed for units 16, 17, 24, 25 and 26 be of the well-known decade tube variety. This tube, manufactured by the Burroughs Corporation and known as the "Beam-X" tube has high speed capabilities in the megacycle range. A separate tube is employed for each tens order of each of the counters. The outputs of similarly numbered electrodes are connected together to form an AND gate. An output from the AND gate is derived when the number stored in counter 24, e.g., equals the count achieved by counter 16. An arrangement of this general nature is shown by Dunn, U.S. Patent 2,774,534, issued December 18, 1956. The output from the 0 unit of each tube is applied as a carry to the next highest order tube so that a decimal count may be stored therein. Such a tube permits economic operation, installation and design of the present system with ease of maintenance.

While we have described and illustrated one specific embodiment of our invention, it will be clear that variations of the details of construction which are specifically illustrated and described may be resorted to without departing from the true spirit and scope of the invention as defined in the appended claims.

We claim:

1. A system for dividing the decimal number N1 by the decimal number N2 comprising a first decimal register for storing a signal representing N1, a second decimal register for storing a signal representing N2, a pulse source, first and second decimal counters simultaneously responsive to said source, said counters and registers all being separate devices, an output decimal counter and indicator, means responsive to the signal stored in said second register and the count achieved by said second counter for advancing the count stored in said output counter and for resetting said second counter to zero when the second counter reaches N2, means responsive to the signal stored in said first register and the count achieved by said first counter for decoupling said counters from said source and for resetting both of said registers and said first and second counters to zero when the first counter reaches N1.

2. The system of claim 1 including means for selectively coupling pulses from said pulse source to said registers, said first and second registers being respectively responsive to N1 and N2 pulses from said source prior to said counters being responsive to said source.

3. A system for performing an arithmetical operation involving the decimal numbers N1 and N2 comprising a first decimal register for storing a signal representing N1, a second decimal register for storing a signal representing N2, first pulse generator means, first and second decimal counters responsive to said first pulse generator means, all of said counters and registers being separate devices, second pulse generator means responsive to the signal stored in said second register and the count achieved by said second counter for deriving an output pulse for resetting the second counter to zero when the second counter reaches N2, third pulse generator means responsive to the signal stored in said first register and the count achieved by said first counter for deriving an output pulse for decoupling said counters from said source and for resetting both of said registers and said first and second counters to zero when the first counter reaches N1, and an output decimal counter and indicator responsive to one of said generator means, said counter and indicator being advanced by one place each time the generator means to which it is responsive derives a pulse.

4. A system for performing an arithmetical operation involving the decimal numbers N1 and N2 comprising a first decimal register for storing a signal representing N1, a second register for storing a signal representing N2, first pulse generator means, first and second decimal counters, said first and second counters and said first and second registers all being separate devices, an output decimal counter, two of asid counters being responsive to said first generator means, second pulse generator means responsive to the signal stored in said second register and the count achieved by said second counter for deriving a pulse when the count achieved by said second counter reaches N2, means for controlling the count of one of said counters in response to the derivation of said pulse by said second generator means, third pulse generator means responsive to the count stored in said first register and the count achieved by said first counter for deriving a pulse for decoupling said two counters from said source and for resetting both of said registers and said first and second counters to zero when the first counter reaches N1, and means for coupling the pulses derived by one of said generator means to said output counter, said output counter being advanced by one place each time the generator means to which it is responsive derives a pulse.

References Cited in the file of this patent

UNITED STATES PATENTS

| | | |
|---|---|---|
| 2,896,848 | Miehle | Jan. 28, 1959 |
| 2,963,222 | Allen | Dec. 6, 1960 |
| 2,997,234 | Hughes | Aug. 22, 1961 |
| 3,006,549 | Hughes | Oct. 31, 1961 |
| 3,039,685 | Bagley et al. | June 19, 1962 |
| 3,043,508 | Wright | July 10, 1962 |